United States Patent
Hoover et al.

(10) Patent No.: US 10,135,827 B2
(45) Date of Patent: *Nov. 20, 2018

(54) SECURE ACCESS TO REMOTE RESOURCES OVER A NETWORK

(71) Applicant: SONICWALL US HOLDINGS INC., Santa Clara, CA (US)

(72) Inventors: Paul Lawrence Hoover, Seattle, WA (US); Rodger Del Erickson, Lawrence, KS (US); Bryan Sauve, Fall City, WA (US)

(73) Assignee: SonicWALL Inc., Milpitas, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/208,197

(22) Filed: Jul. 12, 2016

(65) Prior Publication Data
US 2016/0323286 A1 Nov. 3, 2016

Related U.S. Application Data

(60) Continuation of application No. 13/038,340, filed on Mar. 1, 2011, now Pat. No. 9,407,456, which is a
(Continued)

(51) Int. Cl.
G06F 7/04 (2006.01)
H04L 29/06 (2006.01)
(Continued)

(52) U.S. Cl.
CPC .......... *H04L 63/10* (2013.01); *G06F 21/6218* (2013.01); *H04L 12/4633* (2013.01);
(Continued)

(58) Field of Classification Search
CPC ............. G06F 21/6218; H04L 12/4633; H04L 12/4675; H04L 29/12264; H04L 45/021;
(Continued)

(56) References Cited

U.S. PATENT DOCUMENTS 6,052,780 A 4/2000 Glover et al.
6,081,601 A 6/2000 Raivisto
(Continued)

FOREIGN PATENT DOCUMENTS

EP 0804012 10/1997
EP 1308822 5/2003
(Continued)

OTHER PUBLICATIONS

U.S. Appl. No. 15/180,329, filed Jun. 13, 2016, Chris Hopen, Rule-Based Routing to Resources Through a Network.
(Continued)

*Primary Examiner* — Abiy Getachew
(74) *Attorney, Agent, or Firm* — Polsinelli LLP

(57) ABSTRACT

A client computer hosts a virtual private network tool to establish a virtual private network connection with a remote network. Upon startup, the virtual private network tool collects critical network information for the client computer, and sends this critical network information to an address assignment server in the remote network. The address assignment server compares the critical network information with a pool of available addresses in the remote network, and assigns addresses for use by the client computer that do not conflict with the addresses for local resources. The address assignment server also provides routing information for resources in the remote network to the virtual private network tool. The virtual private network tool will postpone loading this routing information into the routing tables of the client computer until the client computer requests access to a specific resource in the remote network. When the client computer requests access to a specific resource in the remote network, the virtual private network tool will only provide the routing table with the routing information for that specific remote resource.

18 Claims, 8 Drawing Sheets

Related U.S. Application Data division of application No. 12/690,018, filed on Jan. 19, 2010, now Pat. No. 8,090,827, which is a division of application No. 11/927,250, filed on Oct. 29, 2007, now Pat. No. 7,698,388, which is a continuation of application No. 11/371,348, filed on Mar. 7, 2006, now Pat. No. 8,661,158, which is a continuation-in-part of application No. 11/251,592, filed on Oct. 14, 2005, now Pat. No. 8,590,032, and a continuation-in-part of application No. 11/009,692, filed on Dec. 10, 2004, now Pat. No. 8,255,973, said application No. 11/251,592 is a continuation-in-part of application No. 11/009,692, filed on Dec. 10, 2004, now Pat. No. 8,255,973.

(60) Provisional application No. 60/619,151, filed on Oct. 14, 2004, provisional application No. 60/659,494, filed on Mar. 7, 2005, provisional application No. 60/528,870, filed on Dec. 10, 2003.

(51) Int. Cl.
*G06F 21/62* (2013.01)
*H04L 12/46* (2006.01)
*H04L 29/12* (2006.01)
*H04L 29/08* (2006.01)
*H04L 12/755* (2013.01)
*H04L 12/741* (2013.01)

(52) U.S. Cl.
CPC .... *H04L 12/4675* (2013.01); *H04L 29/12264* (2013.01); *H04L 45/021* (2013.01); *H04L 45/745* (2013.01); *H04L 61/2046* (2013.01); *H04L 63/0227* (2013.01); *H04L 63/0272* (2013.01); *H04L 67/327* (2013.01); *H04L 67/42* (2013.01)

(58) Field of Classification Search
CPC ............... H04L 45/745; H04L 61/2046; H04L 63/0227; H04L 63/0272; H04L 63/10; H04L 67/327; H04L 67/42
See application file for complete search history.

(56) References Cited

U.S. PATENT DOCUMENTS

| | | |
|---|---|---|
| 6,081,900 A | 6/2000 | Subramaniam et al. |
| 6,128,279 A | 10/2000 | O'Neil et al. |
| 6,138,153 A | 10/2000 | Collins, III et al. |
| 6,151,631 A | 11/2000 | Ansell et al. |
| 6,199,099 B1 | 3/2001 | Gershman et al. |
| 6,244,758 B1 | 6/2001 | Solymar et al. |
| 6,269,392 B1 | 7/2001 | Cotichini et al. |
| 6,300,863 B1 | 10/2001 | Cotichini et al. |
| 6,321,334 B1 | 11/2001 | Jerger et al. |
| 6,594,704 B1 | 7/2003 | Birenback et al. |
| 6,631,416 B2 | 10/2003 | Bendinelli |
| 6,675,206 B1 | 1/2004 | Britton |
| 6,691,232 B1 | 2/2004 | Wood et al. |
| 6,701,437 B1 | 3/2004 | Hoke et al. |
| 6,760,330 B2 | 7/2004 | Tahan |
| 6,772,350 B1 | 8/2004 | Belani et al. |
| 6,779,030 B1 | 8/2004 | Dugan et al. |
| 6,850,943 B2 | 2/2005 | Texeira et al. |
| 6,873,988 B2 | 3/2005 | Herrmann et al. |
| 6,874,028 B1 | 3/2005 | Feinleib et al. |
| 6,880,005 B1 | 4/2005 | Bell et al. |
| 6,920,502 B2 | 7/2005 | Araujo et al. |
| 6,957,274 B2 | 10/2005 | Trace |
| 7,000,121 B2 | 2/2006 | Jarosz |
| 6,996,631 B1 | 3/2006 | Aiken, Jr. |
| 7,017,162 B2 | 3/2006 | Smith |
| 7,073,093 B2 | 7/2006 | Mannarsamy |
| 7,088,718 B1 | 8/2006 | Srivastava |
| 7,092,987 B2 | 8/2006 | Brittingham et al. |
| 7,093,024 B2 | 8/2006 | Craddock |
| 7,099,955 B1 | 8/2006 | Gregg |
| 7,107,614 B1 | 9/2006 | Boden et al. |
| 7,124,173 B2 | 10/2006 | Moriarty |
| 7,127,493 B1 | 10/2006 | Gautier |
| 7,131,141 B1 * | 10/2006 | Blewett ............... H04L 63/0209 726/12 |
| 7,222,172 B2 | 5/2007 | Arakawa |
| 7,272,625 B1 | 9/2007 | Hannel et al. |
| 7,283,544 B2 | 10/2007 | Johnson et al. |
| 7,289,519 B1 | 10/2007 | Liskov |
| 7,340,483 B1 * | 3/2008 | Gauthier ........... G06F 17/30038 |
| 7,373,660 B1 | 5/2008 | Guichard et al. |
| 7,401,354 B2 | 7/2008 | Boden et al. |
| 7,447,782 B2 | 11/2008 | Tahan |
| 7,461,147 B1 | 12/2008 | Mowat et al. |
| 7,493,380 B2 | 2/2009 | Aman et al. |
| 7,574,738 B2 | 8/2009 | Daude et al. |
| 7,580,919 B1 | 8/2009 | Hannel |
| 7,624,142 B2 | 11/2009 | Jungck |
| 7,644,151 B2 | 1/2010 | Jerrim et al. |
| 7,698,388 B2 | 4/2010 | Hoover |
| 7,760,701 B2 | 7/2010 | Levy-Abegnoli et al. |
| 7,770,222 B2 | 8/2010 | Hopen et al. |
| 7,779,469 B2 | 8/2010 | Hopen et al. |
| 7,822,829 B2 | 10/2010 | Philyaw et al. |
| 7,822,839 B1 | 10/2010 | Pruitt et al. |
| 7,827,590 B2 | 11/2010 | Hopen et al. |
| 7,865,603 B2 | 1/2011 | Braddy et al. |
| 7,870,294 B2 | 1/2011 | Braddy et al. |
| 8,005,983 B2 | 8/2011 | Hopen et al. |
| 8,090,827 B2 | 1/2012 | Hoover et al. |
| 8,205,259 B2 | 6/2012 | Stute |
| 8,255,973 B2 | 8/2012 | Hopen et al. |
| 8,301,769 B2 | 10/2012 | Hopen et al. |
| 8,499,344 B2 | 7/2013 | Read |
| 8,510,474 B2 | 8/2013 | Van Aken et al. |
| 8,590,032 B2 | 11/2013 | Hopen |
| 8,601,550 B2 | 12/2013 | Hopen |
| 8,613,041 B2 | 12/2013 | Hopen |
| 8,615,796 B2 | 12/2013 | Hopen |
| 8,661,158 B2 | 2/2014 | Hoover |
| 9,197,538 B2 | 11/2015 | Hopen |
| 9,300,670 B2 | 3/2016 | Hopen |
| 9,397,927 B2 | 7/2016 | Hopen |
| 9,407,456 B2 | 8/2016 | Hoover |
| 9,628,489 B2 | 4/2017 | Hoover |
| 9,906,534 B2 | 2/2018 | Hopen |
| 2001/0052007 A1 | 12/2001 | Shigezumi |
| 2002/0026576 A1 | 2/2002 | Das-Purkayastha et al. |
| 2002/0053031 A1 | 5/2002 | Bendinelli et al. |
| 2002/0065938 A1 | 5/2002 | Jungck et al. |
| 2002/0078215 A1 | 6/2002 | Tahan |
| 2002/0099937 A1 | 7/2002 | Tuomenoksa |
| 2002/0103903 A1 | 8/2002 | Bruton et al. |
| 2002/0112052 A1 | 8/2002 | Brittingham et al. |
| 2002/0143946 A1 | 10/2002 | Crosson |
| 2002/0161755 A1 | 10/2002 | Moriarty |
| 2002/0167965 A1 | 11/2002 | Beasley et al. |
| 2002/0198984 A1 | 12/2002 | Goldstein et al. |
| 2003/0051042 A1 | 3/2003 | Tazoe |
| 2003/0055990 A1 | 3/2003 | Cheline et al. |
| 2003/0070096 A1 | 4/2003 | Pazi et al. |
| 2003/0074472 A1 | 4/2003 | Lucco et al. |
| 2003/0149766 A1 | 8/2003 | Syvanne et al. |
| 2003/0154306 A1 | 8/2003 | Perry |
| 2003/0191944 A1 | 10/2003 | Rothrock |
| 2003/0196091 A1 | 10/2003 | Raley et al. |
| 2003/0196121 A1 | 10/2003 | Raley et al. |
| 2003/0210791 A1 | 11/2003 | Binder |
| 2003/0229613 A1 | 12/2003 | Zargham et al. |
| 2003/0233401 A1 | 12/2003 | Dean |
| 2004/0003084 A1 | 1/2004 | Malik |
| 2004/0015725 A1 | 1/2004 | Boneh et al. |
| 2004/0015961 A1 | 1/2004 | Chefalas et al. |
| 2004/0042605 A1 | 3/2004 | Evslin |

(56) References Cited

U.S. PATENT DOCUMENTS

| | | | |
|---|---|---|---|
| 2004/0078384 | A1 | 4/2004 | Keir et al. |
| 2004/0078471 | A1 | 4/2004 | Yang |
| 2004/0148439 | A1 | 7/2004 | Harvey et al. |
| 2004/0153533 | A1 | 8/2004 | Lewis |
| 2004/0165592 | A1 | 8/2004 | Chen et al. |
| 2004/0215823 | A1 | 10/2004 | Kleinfelter et al. |
| 2004/0223491 | A1 | 11/2004 | Levy-Abegnoli et al. |
| 2004/0249919 | A1 | 12/2004 | Mattheis |
| 2005/0027784 | A1 | 2/2005 | Fusari |
| 2005/0044544 | A1 | 2/2005 | Slivka et al. |
| 2005/0053063 | A1 | 3/2005 | Madhavan |
| 2005/0076139 | A1 | 4/2005 | Jinmei et al. |
| 2005/0076141 | A1 | 4/2005 | Williams et al. |
| 2005/0083955 | A1 | 4/2005 | Guichard et al. |
| 2005/0120095 | A1 | 6/2005 | Aman et al. |
| 2005/0144286 | A1 | 6/2005 | Szu et al. |
| 2005/0144481 | A1 | 6/2005 | Hopen et al. |
| 2005/0273779 | A1 | 12/2005 | Cheng et al. |
| 2006/0143703 | A1 | 6/2006 | Hopen et al. |
| 2006/0161970 | A1 | 7/2006 | Hopen et al. |
| 2006/0162726 | A1 | 7/2006 | Smith et al. |
| 2006/0271544 | A1 | 11/2006 | Devarakonda et al. |
| 2007/0061887 | A1 | 3/2007 | Hoover et al. |
| 2008/0134302 | A1 | 6/2008 | Hopen et al. |
| 2008/0148364 | A1 | 6/2008 | Hopen et al. |
| 2008/0162698 | A1 | 7/2008 | Hopen et al. |
| 2008/0162726 | A1 | 7/2008 | Hoover et al. |
| 2010/0024008 | A1 | 1/2010 | Hopen et al. |
| 2010/0036955 | A1 | 2/2010 | Hopen et al. |
| 2010/0121943 | A1 | 5/2010 | Hoover et al. |
| 2010/0333169 | A1 | 12/2010 | Hopen et al. |
| 2011/0167101 | A1 | 7/2011 | Hopen et al. |
| 2011/0167475 | A1 | 7/2011 | Hoover et al. |
| 2014/0053237 | A1 | 2/2014 | Hopen |
| 2014/0123225 | A1 | 5/2014 | Hopen |
| 2015/0052248 | A1 | 2/2015 | Hopen |
| 2016/0212136 | A1 | 7/2016 | Hopen |
| 2016/0294778 | A1 | 10/2016 | Hopen |

FOREIGN PATENT DOCUMENTS

| | | |
|---|---|---|
| EP | 2 264 951 | 12/2010 |
| JP | 2004-064182 | 2/2004 |
| JP | 2005-210380 | 8/2005 |
| JP | 2006-013732 | 1/2006 |
| WO | WO 99/057866 | 11/1999 |
| WO | WO 2002/037799 | 5/2002 |
| WO | WO 02/099571 | 12/2002 |
| WO | WO 2006/044820 | 4/2006 |

OTHER PUBLICATIONS

"Microsoft® Computer Dictionary," Fifth Edition, Microsoft Press, May 1, 2002, 2 pages.
Canter, Sheryl "Kill Internet Ads with HOSTS and PAC Files," Online! Mar. 30, 2004, retrieved from the internet URL: http://web.archive.org/web20040426140542/http://www.windowsdevcenter.com/pub/a/windows/2004/03/30/hosts.html, retrieved Jan. 24, 2006.
Cisco et al., "Release Notes for Cisco Cache Engine, Version 2.0.3," Dec. 1999, pp. 1-11.
Kritzner, Ulrich "Objektrferenz-Das Navigator-Objekt," Javascript-Tutorial, Online!, Mar. 31, 2002, XP 002331683 retrieved from http://web/archive.org/web/2002033104028/http://js-tut.aardon.de/js-tut/anhangA/navigator.html.
Napier, Duncan "Setting up a VPN Gateway," Linux Journal, vol. 2002, Issue 93, Specialized Systems Consultants, Inc., Jan. 2002, 11 pages.

NN9603183. "Security for Routing Based on Link State Algorithms." IBM Technical Disclosure Bulletin. Mar. 1996. US. vol. 39, Issue 3, pp. 183-190.
Papadimitratos, Panagiotis et al. "Securing the Internet Routing Infrastructure." IEEE Communications Magazine. Oct. 2002. IEEE Press. 60-68.
Ragunath, Satish et al., "Measurement Based Characterization and Provisioning of IP VPNs," Proceedings of the 4th ACM SIGCOMM Conference on Internet Measurement, ACM Press, Oct. 2004, 342-55.
International Search Report and Written Opinion for PCT/US2005/037292 dated Apr. 7, 2006.
U.S. Appl. No. 11/009,692 Final Office Action dated Dec. 2, 2008.
U.S. Appl. No. 11/009,692 Office Action dated Aug. 29, 2008.
U.S. Appl. No. 12/821,060 Final Office Action dated Mar. 12, 2012.
U.S. Appl. No. 12/821,060 Office Action dated Oct. 27, 2011.
U.S. Appl. No. 11/927,310 Office Action dated Feb. 5, 2010.
U.S. Appl. No. 11/251,592 Final Office Action dated Dec. 6, 2011.
U.S. Appl. No. 11/251,592 Office Action dated Apr. 13, 2011.
U.S. Appl. No. 11/251,592 Final Office Action dated Nov. 9, 2010.
U.S. Appl. No. 11/251,592 Office Action dated Jul. 20, 2010.
U.S. Appl. No. 11/251,592 Final Office Action dated Nov. 3, 2009.
U.S. Appl. No. 11/251,592 Office Action dated Apr. 29, 2009.
U.S. Appl. No. 11/972,272 Final Office Action dated May 12, 2010.
U.S. Appl. No. 11/972,272 Office Action dated Sep. 29, 2009.
U.S. Appl. No. 14/061,988 Office Action dated Nov. 26, 2014.
U.S. Appl. No. 15/180,329 Office Action dated Aug. 8, 2016.
U.S. Appl. No. 12/512,884 Final Office Action dated Aug. 3, 2011.
U.S. Appl. No. 12/512,884 Office Action dated Jan. 19, 2011.
U.S. Appl. No. 12/512,891 Final Office Action dated Aug. 18, 2011.
U.S. Appl. No. 12/512,891 Office Action dated Mar. 1, 2011.
U.S. Appl. No. 14/477,767 Final Office Action dated Oct. 26, 2015.
U.S. Appl. No. 14/477,767 Office Action dated Mar. 17, 2015.
U.S. Appl. No. 11/371,348 Final Office Action dated Feb. 22, 2013.
U.S. Appl. No. 11/371,348 Office Action dated Sep. 21, 2012.
U.S. Appl. No. 11/371,348 Final Office Action dated Jun. 6, 2011.
U.S. Appl. No. 11/371,348 Office Action dated Nov. 30, 2010.
U.S. Appl. No. 11/371,348 Final Office Action dated Mar. 24, 2010.
U.S. Appl. No. 11/371,348 Office Action dated Sep. 25, 2009.
U.S. Appl. No. 12/690,018 Office Action dated Feb. 9, 2011.
U.S. Appl. No. 13/038,340 Final Office Action dated Feb. 2, 2016.
U.S. Appl. No. 13/038,340 Office Action dated Jun. 2, 2015.
U.S. Appl. No. 13/038,340 Final Office Action dated Dec. 17, 2013.
U.S. Appl. No. 13/038,340 Office Action dated Sep. 6, 2013.
U.S. Appl. No. 13/038,340 Final Office Action dated Jul. 25, 2013.
U.S. Appl. No. 13/038,340 Office Action dated Mar. 14, 2013.
U.S. Appl. No. 13/038,340 Office Action dated Dec. 5, 2012.
U.S. Appl. No. 11/251,087 Office Action dated Jul. 20, 2010.
U.S. Appl. No. 11/251,087 Final Office Action dated Mar. 3, 2010.
U.S. Appl. No. 11/251,087 Office Action dated Aug. 20, 2009.
U.S. Appl. No. 11/927,286 Office Action dated Nov. 17, 2009.
U.S. Appl. No. 12/938,330 Final Office Action dated Feb. 1, 2013.
U.S. Appl. No. 12/938,330 Office Action dated Jun. 27, 2011.
U.S. Appl. No. 14/058,215 Final Office Action dated Aug. 26, 2015.
U.S. Appl. No. 14/058,215 Office Action dated Feb. 5, 2015.
U.S. Appl. No. 15/082,485 Office Action dated Jul. 18, 2016.
U.S. Appl. No. 15/180,329 Office Action dated Jun. 16, 2017.
U.S. Appl. No. 15/476,547 Office Action dated Jul. 12, 2017.
U.S. Appl. No. 15/180,329 Final Office Action dated Dec. 9, 2016.
U.S. Appl. No. 15/907,194, filed Feb. 27, 2018, Chris Hopen, Remote Access to Resources Over a Network.
U.S. Appl. No. 15/476,547, Chris Hopen, Remote Access to Resources Over a Network.

* cited by examiner

SECURE ACCESS TO REMOTE RESOURCES OVER A NETWORK

CROSS-REFERENCE TO RELATED APPLICATIONS

This application is a continuation and claims the priority benefit of U.S. patent application Ser. No. 13/038,340 filed Mar. 1, 2011, now U.S. Pat. No. 9,407,456 which is a divisional and claims the priority benefit of U.S. patent application Ser. No. 12/690,018 filed Jan. 19, 2010, now U.S. Pat. No. 8,090,827, which is a divisional and claims the priority benefit of U.S. patent application Ser. No. 11/927,250 filed Oct. 29, 2007 now U.S. Pat. No. 7,698,388, which is a continuation and claims the priority benefit of U.S. patent application Ser. No. 11/371,348 filed Mar. 7, 2006, now U.S. Pat. No. 8,661,158, which is a continuation-in-part and claims the priority benefit of U.S. patent application Ser. No. 11/251,592 filed Oct. 14, 2005, now U.S. Pat. No. 8,590,032, which claims the priority benefit of U.S. provisional application No. 60/619,151, filed Oct. 14, 2004; U.S. patent application Ser. No. 11/371,348 also claims the priority benefit of U.S. provisional application No. 60/659,494 filed Mar. 7, 2005, U.S. patent application Ser. No. 11/371,348 is also a continuation-in-part of and claims the priority benefit of U.S. patent application Ser. No. 11/009,692 filed Dec. 10, 2004, now U.S. Pat. No. 8,255,973, which claims the priority benefit of U.S. provisional application No. 60/528,870 filed Dec. 10, 2003, U.S. patent application Ser. No. 11/251,592 is a continuation-in-part and claims the priority benefit of U.S. patent application Ser. No. 11/009,692 filed Dec. 10, 2004, now U.S. Pat. No. 8,255,973 which claims the priority benefit of U.S. provisional application No. 60/528,870, filed Dec. 10, 2003. The disclosures of the aforementioned applications are incorporated herein by reference.

BACKGROUND OF THE INVENTION

1. Field of the Invention

The present invention relates to the routing of data between a client computer and one or more resources through a network. Various aspects of the invention may be used to help ensure that data, exchanged between a client computer and resources in a remote network, is routed using network addresses that do not conflict with addresses local to the client computer.

2. Description of the Related Art

In the last decade, the use of electronic computer networks has greatly increased. Electronic computer networks may be found in businesses, schools, hospitals, and even residences. With these networks, two or more computing devices communicate together to exchange packets of data according to one or more standard protocols, such as the Transmission Control Protocol/Internet Protocol. Usually, one computer, often referred to as a "client" or "client" computer, requests that a second computer perform a service. In response, the second computer, often referred to as a "server" or "server" computer, performs the service and communicates the resulting data back to the first computer.

As reliance on computers has increased, the demand to access computer resources from a variety of locations has increased as well. Conventionally, for example, a business user may have accessed resources on a corporate server through a desktop computer connected to the corporate server by a private, secure corporate network. Now, however, that user may wish to access the same corporate resources from a remote location over a public network, such as the Internet. For example, a user may need to access resources through a corporate network from a personal computer while at home or from a laptop computer while traveling. In order to securely access these network resources, the user will typically employ an encrypted communication technique. The connection formed by the client computer and a server computer (or by the client computer and another network available through a server computer) often is referred to as a Virtual Private Network (VPN).

A virtual private network can be formed using a plurality of different encrypted communication techniques. For example, a client computer may implement a temporary or permanent dedicated communication software application to securely communicate with a server computer. The dedicated communication software application will then encrypt and send messages to the server computer, and receive and decrypt messages received from the server computer. Some examples of this type of dedicated communication software application may embed encrypted messages in conventionally formatted data packets, so that the encrypted messages are unreadable from outside of the secure communication channel. The virtual private networks that employ these embedded communication techniques are sometimes referred to as "tunneling" virtual private networks, because their communications appear to "tunnel" through a public network such as the Internet.

It also should be appreciated that, with some implementations of a virtual private network, the client computer can communicate point-to-point with some or all of the nodes within another network available through the server computer. With still other implementations of a virtual private network, however, the client computer may directly communicate with only a proxy software application on the server computer. The proxy software application will then decrypt communications from the client computer, and route them to the appropriate node within the network. With this type of virtual private network, the proxy software application may be hosted on a computer (or computing node) outside of a firewall protecting the rest of the network. The proxy software application communicates with network nodes through the firewall. Different types of virtual private networks may employ any desired encryption technique. For example, a virtual private network may implement communication channels secured using the Secure Socket Layers (SSL) protocol, the Hypertext Transfer Protocol Secure (HTTPS) protocol (which employs the Secure Socket Layers (SSL) protocol), or the Internet Protocol Security (IPSec) protocol.

While a virtual private network can provide a client computer with secure access to remote resources through a network, the network addresses for the remote resources may conflict with local network addresses. For example, a user may purchase a cable modem or local router for a home network which uses the IP address range 192.168.x.x. Many commercial systems also use this IP address range of 192.168.x.x, however. Accordingly, when the user's computer attempts to access a resource in a remote network, such as a corporate network maintained by the user's employer, the address of the resource on the remote network may conflict with a local resource on the user's home network. For example, in some situations, a server on the remote network may allocate addresses to the client computer for accessing one or more resources on the remote network. If one of these network addresses conflicts with the network address for the network interface card (NIC) of the client computer, the conflict may prevent the client computer from accessing any external resources. As a result, an address conflict may prevent the user's computer from accessing a desired resource in the remote network, or even access a local resource.

Accordingly, it would be desirable to be able to resolve network address conflicts between a client computer's local resources and the resources on a remote network. Further, it would be desirable to resolve conflicts without overwhelming the routing table provided on the client computer or creating unnecessary conflicts within the routing table.

SUMMARY OF THE INVENTION

Various aspects of the invention relate to techniques for resolving address conflicts between network addresses for resources that are local to a client computer and network addresses for resources in a remote network. With some implementations of the invention, for example, the client computer hosts a virtual private network tool to establish a virtual private network connection with a remote network. Upon startup, the virtual private network tool collects address information from the network interfaces of the client computer. For example, the virtual private network tool may obtain, for each network interface, the IP address for local resources such as the local gateway, Domain Name System (DNS) servers on the local network, Windows Internet Naming Service (WINS) servers on the local network, and the like. The virtual private network tool then sends this local resource address information to an address assignment server in the remote network.

The address assignment server has access to a pool of addresses that are available for use by nodes in the remote network. When it receives the local resource address information from the client computer, the address assignment server compares the addresses in the local resource address information with the pool of addresses for the remote network. The address assignment server then will select addresses for use by the client computer that do not conflict with the addresses for local resources. For example, the client computer may employ a virtual network interface card (also known as a virtual network adapter or just virtual adapter) to act as a node of the remote network. The address assignment server will select an virtual IP address for the virtual network adapter that will not conflict with the IP address of the physical network adapter being used by the client computer.

The address assignment server also has access to a list of resources in the remote network that are available to the client computer. When the client computer joins the remote network, the address assignment server provides routing information for these remote resources to a virtual private network tool hosted by the client computer. The virtual private network tool will postpone loading this routing information into the routing tables for the client computer, however, until the client computer requests access to a specific resource in the remote network. When the client computer does request access to a specific resource in the remote network, the virtual private network tool will only provide the routing table with the routing information for that specific remote resource. In this manner, address conflicts between local resources and remote resources can be avoided until the client computer requests access to a remote resources address that actually conflicts with a local resource address.

DETAILED DESCRIPTION

Client/Server Configuration

Various embodiments of the invention will typically be employed to facilitate cooperation between a client and one or more servers in a remote network. As known in the art, a client/server configuration (including a Web-based architecture configuration) occurs when a computing device requests the use of or access to a resource from another computing device. For convenience and ease of understanding hereafter, requests to use, obtain, or otherwise access a resource may generically be referred to simply as "requesting" a resource, while using, obtaining, or otherwise accessing a resource may generically be referred to simply as "obtaining" or "accessing" a resource. Because the computing device responsible for providing the resource "serves" the computing device that initially requests the resource, the computing device responsible for providing the resource often is referred to as a "server." The computing device initially requesting the resource then commonly is referred to as a "client."

Figure 1:
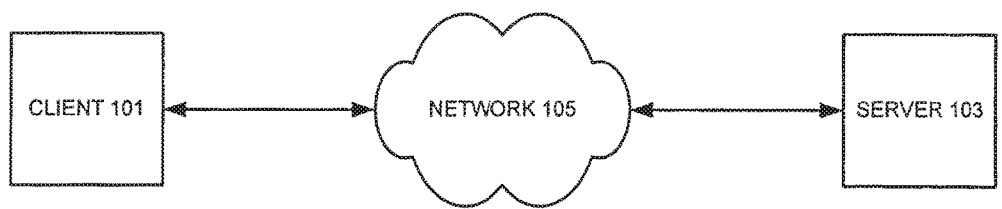
FIG. 1 shows one example of a conventional client/server network.

FIG. 1 illustrates a conventional relationship between a client 101 and a server 103. As seen in this figure, the client 101 may transmit the request for one or more resources to the server 103 over a network 105. The network 105 may be a private network, such as an intranet, or a public network, such as the Internet. The server 103 may then provide the client 101 with access to the requested resources over the network 105.

It should be noted that, as used herein, a server may be considered a virtual device rather than a physical device. For example, the functions of the server 103 may be performed by a single computing device. Alternately, the functions of the server 103 may be performed by a group of computing devices cooperating together. Similarly, a client may be considered a virtual device. That is, one or more separate computing devices can cooperate together to function as a client. In many situations, a client computer may work with multiple server computers in a remote network to access a resource. For example, a client computer may submit the request for a resource to a first server computer, which may then relay the request though the remote network to a second server computer. The second server computer may authenticate the identity of the client computer (or a user employing the client computer), to determine whether the client computer has permission to access the requested resource. Yet another server computer in the remote network may then actually provide the client computer with access to the requested resource.

As used herein, a resource may be any type of object or service available through a server computer. For example, a resource may be a data file or a directory of data files. A resource may also be a service, such as an electronic mailing service, a database service, a document management service, a remote shell or terminal service, or any other service provided by an executing software application. Further, a resource may be within a network, or it may be located outside of a network but accessible to the client computer through a network.

Example Computing Device

Various embodiments of a virtual private network according to the invention may be implemented using dedicated analog or digital electronic circuitry. More typically, however, the various features of the invention will be implemented by executing software instructions on a programmable computing device or computer. For example, each node in a virtual private network will typically be implemented by executing software instructions on a programmable computing device or computer. Accordingly, FIG. 2 shows one example of a computer 201 that can be used to implement various aspects of the invention.

Figure 2:
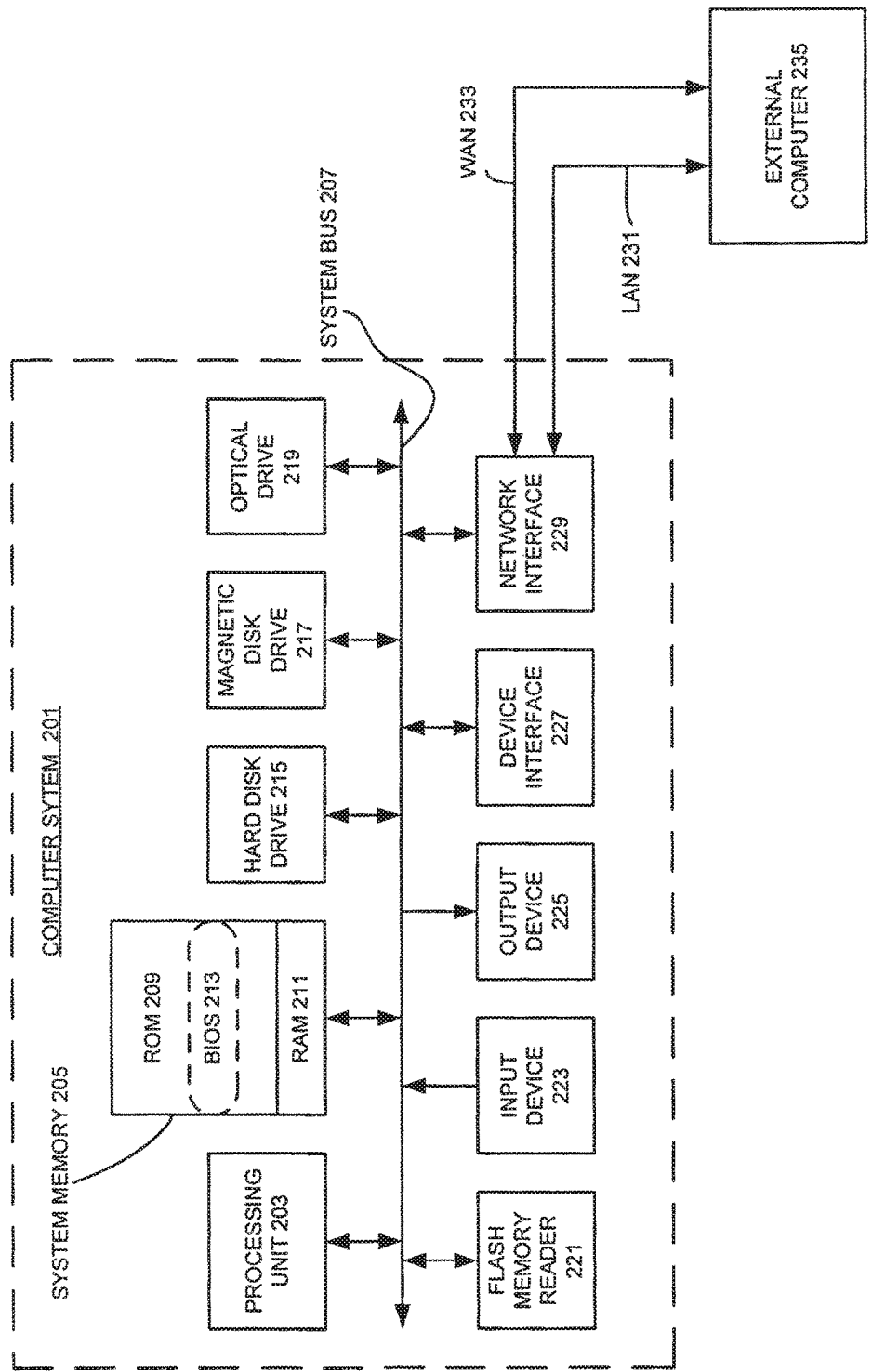
FIG. 2 shows an example of a computing device that can be used to implement a network appliance according to various examples of the invention.

The computer system 201 illustrated in FIG. 2 includes a processing unit 203, a system memory 205, and a system bus 207 that couples various system components, including the system memory 205, to the processing unit 203. The system memory 205 may include a read-only memory (ROM) 209 and a random access memory (RAM) 211. A basic input/output system 213 (BIOS), containing the routines that help to transfer information between elements within the computer system 201, such as during startup, may be stored in the read-only memory (ROM) 209. The computer 201 also may include a hard disk drive 215 for reading from and writing to a fixed magnetic storage disk, a magnetic disk drive 217 for reading from or writing to a removable magnetic disk, or an optical disk drive 219 for reading from or writing to a removable optical disk such as a CD-ROM or other optical media, and a flash memory reader 221 for reading from or writing to a removable flash memory. Of course, the computer 201 may alternately or additionally include any other type of desired memory storage device, such a "punched" memory drive for reading from or writing to a memory medium that uses deformations or holes in the medium to record data. If the computer system 201 is embodied by a special-purpose "server application" computer system 201, it may further include, for example, another processing unit 203.

A number of program modules may be stored on the ROM 209, the hard disk drive 215, the magnetic disk drive 217, the optical disk drive 219 and the flash memory reader 221. A user may enter commands and information into the computer system 201 through an input device 223, such as a keyboard, a pointing device (e.g., a mouse, touchpad, joystick trackball or the like), a touch screen, a microphone or any other suitable interface device. Of course, the computer system 201 may simultaneously employ a variety of different input devices 223, as is known in the art. One or more output devices 225, such as a monitor or other type of display device, typically will also be included to convey information from the computer system 201 to the user. As will be appreciated by those of ordinary skill in the art, a variety of combinations of output devices 225, such as displays, speakers and printers, may be included in the computer system 201. The computer system 201 also may have one or more device interfaces 227. A device interface may be any suitable interface for transferring data to or receiving data from another device, such as an RS-232 port, a USB port, a PS2 port, an infrared or Bluetooth wireless port, or the like. It should be noted that, with various examples of the computer 201, one or more of the input devices 223 and the output devices 225 may be connected to the system bus 207 through a device interface 227.

In order to access other computing devices, the computer system 201 should be capable of operating in a networked environment using logical connections to one or more remote computing devices, such as the device interface 227. Accordingly, the computer 201 may include a network interface 229. The network interface 229 may be implemented, e.g., using a conventional Network Interface Card (NIC) (also sometimes referred to as a network adapter). The computer 201 may have a wired network interface 229, a wireless network interface 229, or any combination of the two. For example, the computer 201 may have two wired network interfaces 229 and a single wireless network interface 229. The computer system 201 then can connect to a local area network (LAN) 231 through the network interface 229. Alternately or additionally, the computer 201 may connect to a wide area network (WAN) 233, such as the Internet, through the network interface 229.

Using the network interface 229 to connect to a LAN 231 or a WAN 233, the computer may communicate with another, external computer 235 (or other computing device). As used to describe various examples of the invention herein, if the computer 201 communicates with an external computer 235 in a remote network for which WAN 233 acts as a pathway, then that external computer 235 may be referred to as a "remote" computer. Other computing devices that are not in the remote network may then be referred to as "local" devices.

A Virtual Private Network System

Figure 3:
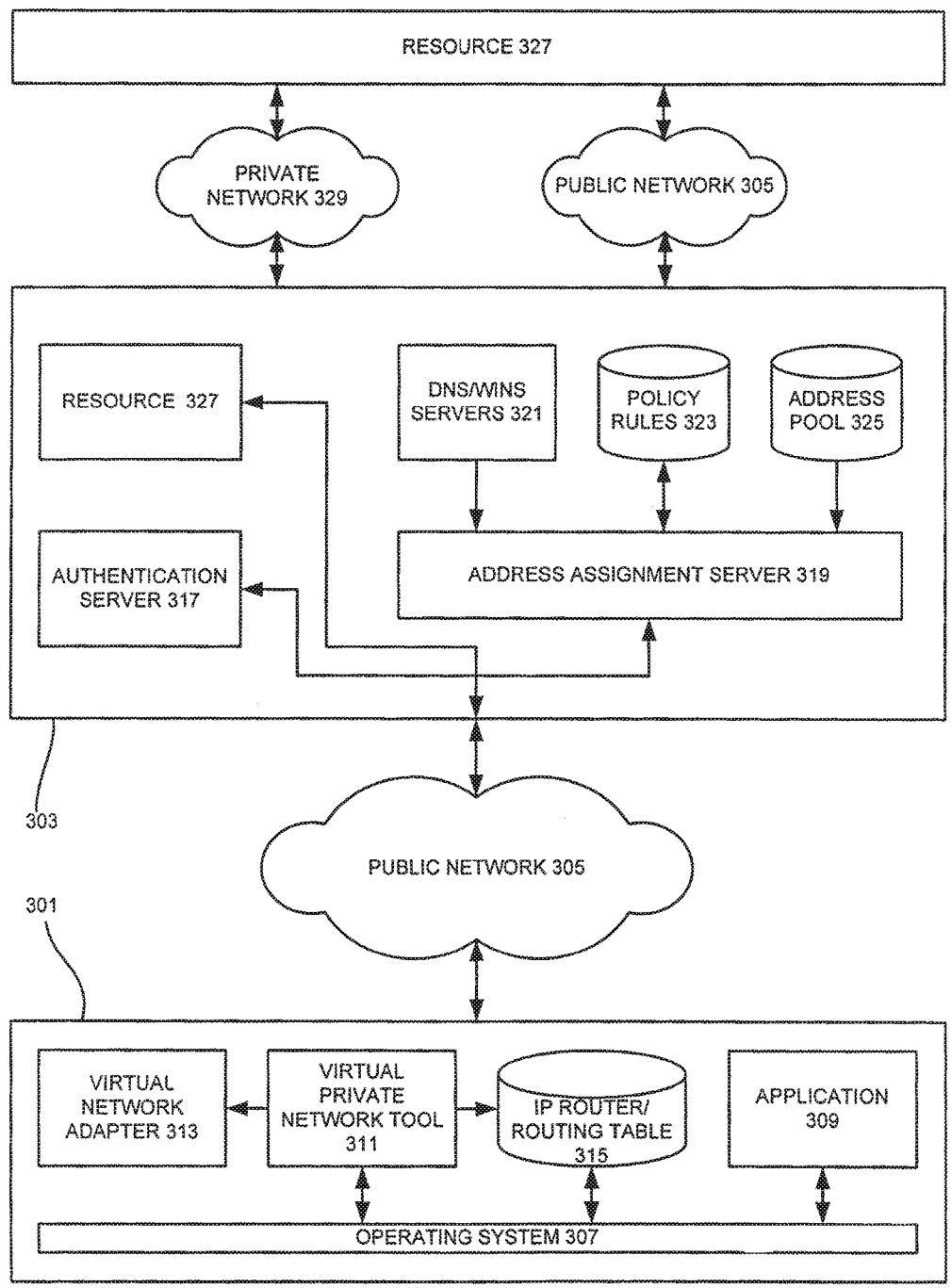
FIG. 3 shows an example of a virtual private network system that may be employed according to various examples of the invention.

FIG. 3 illustrates one example of a virtual private network that may be used to implement various embodiments of the invention. As seen in this figure, the virtual private network includes a client computer 301 and a remote network 303 connected through a public network 305, such as the Internet. The client computer 301 includes an operating system 307, at least one software application 309, and a virtual private network tool 311. As will be explained in more detail below, the software application 309 may request access to a resource in (or through) the remote network 303. In turn, the virtual private network tool 311 provides a secure communication channel through the public network 305 to the remote network 303.

The client computer 301 also includes a virtual network adapter 313 and IP router/routing table 315. As will be appreciated by those of ordinary skill in the art, the virtual network adapter 313 is implemented by the execution of software instructions that simulate the operation of a physical network interface card. With some examples of the invention, the virtual network adapter 313 will be instantiated by the virtual private network tool 311. With alternate examples of the invention, however, the virtual network adapter 313 may be independent of the virtual private network tool 311. The IP router/routing table 315 stores routes, in the form of network addresses, for accessing local and remote resources. As will be explained in more detail below, the software application 309 will employ routes in the IP router/routing table 315, populated by the virtual private network tool 311, to access resources through the remote network 303. The operating system 307 then manages the operation of the software application 309, the virtual private network tool 311, the virtual network adapter 313, and the IP router/routing table 315.

The remote network 303 includes an authentication server 317, an address assignment server 319, one or more Domain Name System (DNS) servers and/or Windows Internet Name Service (WINS) servers (collectively referred to as DNS/WINS server 321), policy rules 323, and a pool 325 of network addresses. Each of the DNS/WINS servers 321 translates a host name (corresponding to a resource) into a network address. For example, a DNS server may translate a domain name, such as mycompany.com, into the network address corresponding to the computer hosting that domain name, such as 192.68.42.12. The authentication server 317 authenticates the identity and, with some examples of the invention, the operating environment of the client computer 301. Based upon a successful authentication, the authentication server 317 will then establish a secure connection tunnel with the virtual private network tool 311 in the client computer 301. The connection tunnel may be, for example, any type of virtual private network connection. Thus, the authentication server 317 may establish a virtual private network connection tunnel with the virtual private network tool 311 using the Secure Sockets Layer (SSL) protocol.

As will be explained in more detail below, the authentication server 317 (or a separate policy server, not shown) compares the authentication information for the client computer 301 with access policies set by a network administrator or other authorized person, in order to determine which addresses in the remote network are available for use by the virtual network adapter 313. These addresses are then included in the address pool 325.

Once the authentication server 317 (or a separate policy server, not shown) has determined the addresses that can be used by the virtual network adapter 313, the address assignment server 319 will compare local network information for the client computer 301 with the available network addresses in the address pool 325, to determine whether any of these addresses will conflict with local addresses for the client computer 301. It then assigns addresses to the virtual network adapter 313 that do not conflict with the provided local network information.

The remote network 303 also includes one or more resources 327. The resource 327 may be implemented by any server or combination of servers responsible for providing one or more resources 327 to client 303. For example, the resource 327 may be a Domain Name Service (DNS) server, an electronic mail server, a server that maintains a database, a print server, a data storage server, a file or document management server, a Voice over Internet Protocol (VoIP) server, a remote shell or terminal service or the like. With some implementations of the invention, the resource 327 may only be indirectly responsible for providing requested resources. For example, the resource server 327 may be a proxy server providing a connection to yet another server through, for example, a private network, which will actually provide the requested resources to the client 303. It should be noted that a resource 327 may be located within the remote network 303. Alternately or additionally, a resource 327 may be accessible by the remote network 303 through a public network 305, such as the Internet, or by a private network 329 as shown in FIG. 3.

With various examples of the invention, the authentication server 317 (or a separate policy server, not shown) also compares the authentication information for the client computer 301 with the access policies to determine which of the resources 327 may be accessed by the user of the client computer 301 (or by a user of the client computer 301 or the software application 309 in particular). Based upon these access policies, the authentication server 317 (or a separate policy server, not shown) will create the policy rules 323 for the resources 327. From these policy rules 323, the address assignment server 319 will then generate VPN routing rules for providing routing information to the IP router/routing table 315 in the client computer 301, and send these VPN routing rules to the virtual private network tool 311.

Configuration of the Virtual Network Adapter

As will be appreciated by those of ordinary skill in the art, the virtual network adapter 313 operates through a physical network adapter 229, such as a network interface card (NIC). In some examples of the invention, the physical network adapter 229 serves as a node in a local area network (LAN), such as a user's home network, a network maintained by, e.g., a hotel, airport, office, coffee shop, Internet cafe or the like. After the virtual private network tool 311 has established a virtual private network connection with the remote network 303, the virtual network adapter 313 then may serve as a wide area network (WAN) node in the remote network 303. Thus, the virtual network adapter 313 may "tunnel" through a local area network to act as a WAN node in the network 303.

Because the virtual network adapter 313 operates through the physical network adapter 229, however, the network information used by the virtual network adapter 313 cannot conflict with critical network information for the physical network adapter 229. For example, the virtual IP address (VIP) of the virtual network adapter 313 cannot be the same as the IP address being used by the physical network adapter 229. Accordingly, the virtual network adapter 313 should be configured using network information that does not conflict with critical network information being used by the physical network adapter 229.

Figure 4A:
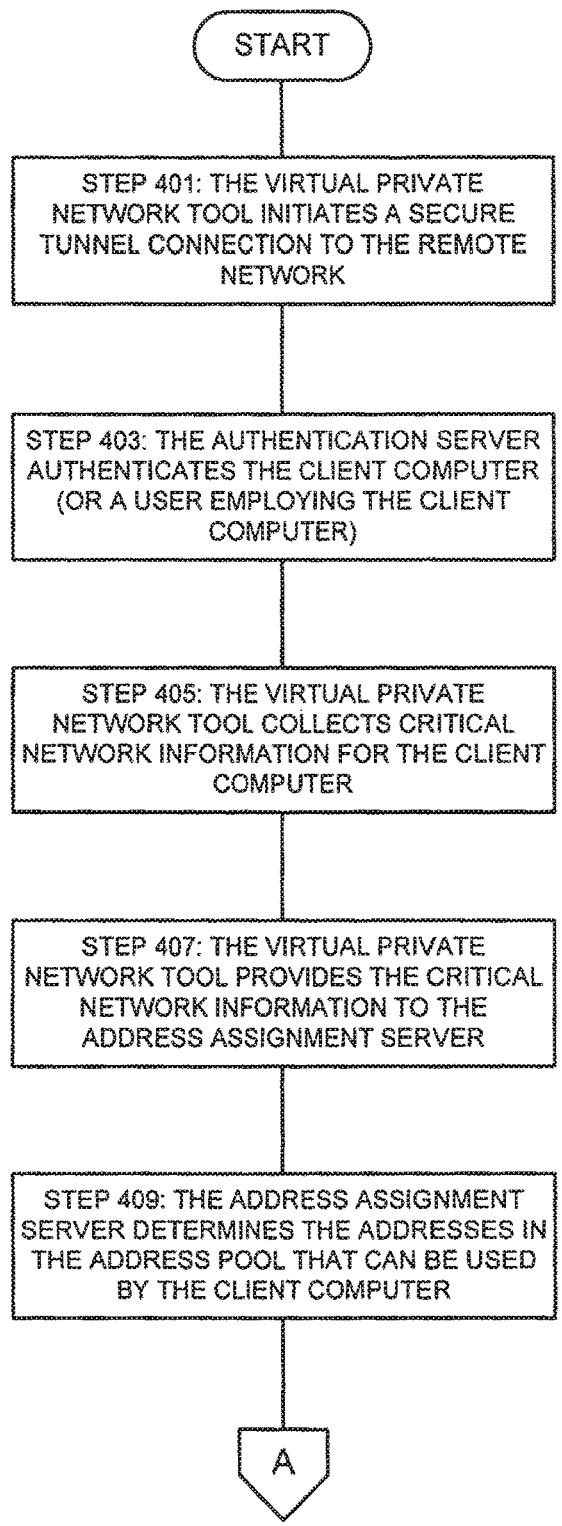
FIGS. 4A and 4B illustrate a flowchart showing the configuration of a virtual network adapter on a client computer according to various examples of the invention.
Figure 4B:
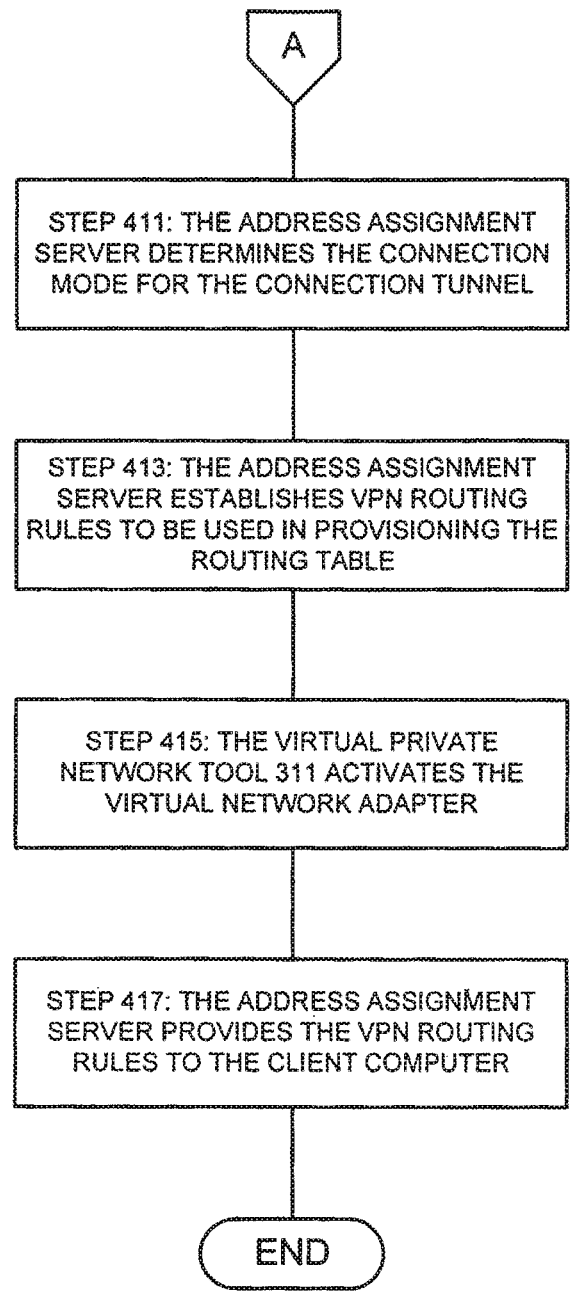

FIGS. 4A and 4B illustrate a method of configuring the virtual network adapter 313 according to various examples of the invention. The process begins in step 401 when the virtual private network tool 311 initiates a secure tunnel connection to the remote network 303. As previously noted, the virtual private network tool 311 may employ any desired secure communication technique, such a virtual private network (VPN) technique, to establish a secure tunnel connection with the remote network 303. For example, the virtual private network tool 311 may establish an encrypted SSL connection with the remote network 303. With some examples of the invention, the virtual private network tool 311 may first establish the secure connection tunnel with the authentication server 317. Alternately, the virtual private network tool 311 may establish the connection tunnel with another server, such as a special-purpose server (not shown) for setting up a connection tunnel with the client computer 301, which then communicates with the authentication server 317.

Next, in step 403, the authentication server 317 authenticates the client computer 301 (or a user employing the client computer 301). With some implementations of the invention, this may be a simple identity authentication using any desired conventional techniques, such as the exchange of encryption key information. As will be discussed in more detail below, however, alternate implementations of the invention may employ the rule-based routing system described in U.S. patent publication No. 2006-0143703, entitled "Rule-Based Routing To Resources Through A Network," naming Chris Hopen et al. as inventors and filed on Oct. 14, 2005, which application is incorporated entirely herein by reference. As discussed in detail in that application, the authentication information is compared with access policies set up by a network administrator or other authorized person. Based upon this comparison, policy rules 323 are created which control which resources 327 may (or may not) be accessed by the client computer 301 (or, with some implementations of the invention, by the user of the client computer 301 or by a specific application 309 hosted on the client computer 301). With some examples of the invention, these access policies also may be used to determine which available network addresses should be included in the address pool 325.

Once the client computer 301 has been authenticated, the virtual private network tool 311 collects critical network information for the client computer 301 in step 405. As previously noted, the virtual network adapter 313 will be tunneling through a physical network interface card 229. To avoid conflicting with the operation of any physical network adapter 229 being used by the client computer 301, the virtual private network tool 311 obtains the critical network information for each physical network adapter 229. For example, if the virtual network adapter 313 is tunneling through a physical network interface card 229 connected to a local area network, then the critical network information obtained by the virtual private network tool 311 will include the Internet protocol (IP) address and the subnet for each physical network adapter 229 being used by the client computer 301. It also will include the IP address of the default gateway being used by the local area network, and the IP addresses of the DNS and/or WINS servers that are used by each physical network adapter 229 to resolve domain names. Also, if a physical network adapter 229 is using the Dynamic Host Configure Protocol (DHCP) to obtain a network address, then the network address of the DHCP server providing the network address will be included in the critical network information. With some implementations of the invention, the critical information also may include the domain suffix for the local area network.

The virtual private network tool 311 may identify the critical network information using any desired technique, such as by querying application programming interfaces (APIs) provided by the operating system 307 for network interface configuration. This operation will be analogous to using the "ipconfig/all" command available windows command provided by the Windows operating system available from Microsoft Corporation of Redmond, Wash. It should be appreciated, however, that various techniques for identifying the critical information will be well known to those of ordinary skill in the art, and any suitable technique may be employed. It also should be appreciated that the specific critical network information may vary depending upon, for example, the configuration and use of each physical network adapter 229.

Once the critical network information has been collected, the virtual private network tool 311 provides the collected information to the address assignment server 319 in step 407. In response to receiving the critical network information (and any other provided state information) for the client computer 301, the address assignment server 319 analyzes the address pool 325 in step 409 to determine non-conflicting network information that can safely be used to provision the virtual network adapter 313 for operation. For example, the address assignment server 319 will assign a virtual IP (VIP) address for the virtual network adapter 313. It also will assign at least one name service host address, such as an address to a DNS server 321, and corresponding routing information for the assigned name server host address. If the address assignment server 319 cannot assign network information to provision the physical network adapter 229 without conflicting with the critical network information, then the address assignment server 319 sends an error message to the client computer 301 and terminates the process.

In some implementations of the invention, the address assignment server 319 may assign network information for use by the virtual network adapter 313 that conflicts with non-critical network information, such as the network address of a local DNS server among a plurality of DNS servers being used by the physical network adapter 229. These examples of the invention may then identify these conflicting addresses in, e.g., a log, which can be sent to the virtual private network tool 311 for use by the client computer 301.

As previously noted, some implementations of the invention may employ the rule-based routing system described in U.S. patent application Ser. No. 11/251,592. As discussed in detail in that patent application, the remote network 303 may employ the authentication server 317 a separate policy server (not shown) to create policy rules 323 that control access to resources 327 within the network 303. These policy rules 323 may be based upon, for example, access privileges assigned to the client computer 301, a community of which the client computer 301 is a member, the identity of the person using the client computer 301, the application 309 seeking access to the resource, the computing environment in which the client computer 301 is operating or any combination thereof.

With these implementations of the invention, any name service host address assigned for use by the virtual adapter 313 will be obtained from the policy rules 323 (i.e., any assigned name service host address will be identified as an accessible resource 327 in the policy rules 323. Also, if the policy rules 323 prohibit the client computer 301 from using one or more addresses in the pool 325, then it is irrelevant whether or not these addresses will conflict with either the critical network information or addresses for other local resources of the client computer 301.

Next, in step 411, the address assignment server 319 determines the connection mode for the connection tunnel. The connection mode, which typically is set by the network administrator, may be a "redirect all" mode or a "split tunnel" mode. In the redirect all mode, the address assignment server 319 can override the addresses for the DNS and WINS servers that normally would be used by each physical network adapter 229 by allocating the virtual network adapter 313 conflicting addresses for the IP router/routing table 315, along with rules giving precedence to the assigned addresses of the DNS/WINS servers 321. In this mode, all data sent through the virtual network adapter 313 will be redirected to the remote network 303.

For the split tunnel mode, the address assignment server 319 can override all of the addresses for DNS and WINS servers that normally would be used by each physical network adapter 229, except for one. This arrangement allows the client computer 301 to achieve both virtual private network and non-virtual private network split tunneling through the virtual network adapter 313 and physical network adapters 229 respectively. Thus, the address assignment server 319 will identify and allocate one set of addresses for the DNS/WINS servers 321 that do not conflict with the addresses for DNS and WINS servers that normally would be used by the physical network adapters 229.

In the split tunnel mode, the address assignment server 319 may have to eliminate the addresses of one or more of the DNS/WINS servers 321 to avoid a conflict with the one required address for a DNS server and a WINS already employed by the client computer 301. For this reason, split tunnel mode will not work with a single pair of DNS and WINS servers 321 and a single pair of DNS and WINS servers employed by the client computer 301, respectively, that conflict. If this situation occurs, an error message is generated to the client computer 301, and the process ends.

In step 413, the address assignment server 319 then establishes the VPN routing rules that will be used to add routing information to the IP router/routing table 315 for accessing the resources 327. More particularly, the address assignment server 319 will prepare VPN routing rules based upon the policy rules 323 to control how routing information for the resources 327 is added to the IP router/routing table 315. With various examples of the invention, each VPN routing rule will contain a resource identifier value and a permission value. The resource identifier value may be an IP address or a fully qualified domain name that identifies a single resource 327. The resource identifier value also may identify a set of one or more resources 327. That is, the resource identifier value also may be a partially-qualified domain name or a plurality of IP addresses, expressed either as a subnet or a range of IP addresses.

With some examples of the invention, the permission value will only be an "inclusion" value, indicating that the resource or resources 327 identified by the resource identifier value can be accessed by the client computer 301 via the remote network 303. Some implementations of the invention, however, may also allow the permission value to be an "exclusion" value, indicating that the resource or resources 327 identified by the resource identifier value cannot be accessed by the client computer 301. (It should be noted that an "exclusion" value in a VPN routing rule does not exclude a resource 327 from being accessed using a different mechanism separately from the remote network 303, such as through a local area network or through a separate wide area network.)

As discussed in U.S. patent application Ser. No. 11/251, 592, an exclusion rule will take precedence over an inclusion rule. Thus, if one VPN routing rule indicates that a client computer 303 may access any resource 327 in a domain "yourcompany.com," but another VPN routing rule indicates that the client computer 303 may not access the resource 327 named "accounting.yourcompany.com," then the client computer 301 will be prohibited from accessing the resource 327 named "accounting.yourcompany.com." Also, with various examples of the invention, a VPN routing rule having a more specific resource identifier value (e.g., network address 128.20.1.12) will take precedence over a VPN routing rule having a more generic resource identifier value (e.g., a subnet address 128.20.1.0).

In step 415, the virtual private network tool 311 activates the virtual network adapter 313. That is, the address assignment server 319 provides the provisioning network information to the virtual private network tool 311. The virtual private network tool 311 then registers the provisioning network information with the operating system 307 to activate the virtual network adapter 313, and its interface address information is bound to the IP router/routing table 315. Then, in step 417, the address assignment server 319 provides the VPN routing rules to the virtual private network tool 311 for subsequent use in accessing the resources 327, as will be described in more detail below.

Employing the VPN Routing Rules

With some implementations of the invention, the virtual private network tool 311 could provide all of the routing rule information to the IP router/routing table 315 at one time. Depending upon the size of the VPN routing rules, however, this might greatly increase the overhead required to maintain and search the IP router/routing table 315. Moreover, the VPN routing rules could introduce unnecessary address conflicts to the IP router/routing table 315 for resources 327 that may never be requested by the client computer 301. Accordingly, with various embodiments of the invention, the virtual private network tool 311 initially will only provide the IP router/routing table 315 with the VPN routing rules for accessing name service hosts in the remote network 303, i.e., the DNS/WINS servers 321. When the application 309 submits an address resolution query to one or more of the DNS/WINS servers 321 through the virtual network adapter 313, the query reply is monitored to determine what additional routing information should be provided to the IP router/routing table 315. Similarly, when the application 309 provides an IP address to the operating system 307 to access a resource 327, the IP address is monitored to determine what additional routing information should be provided to the IP router/routing table 315.

Figure 5:
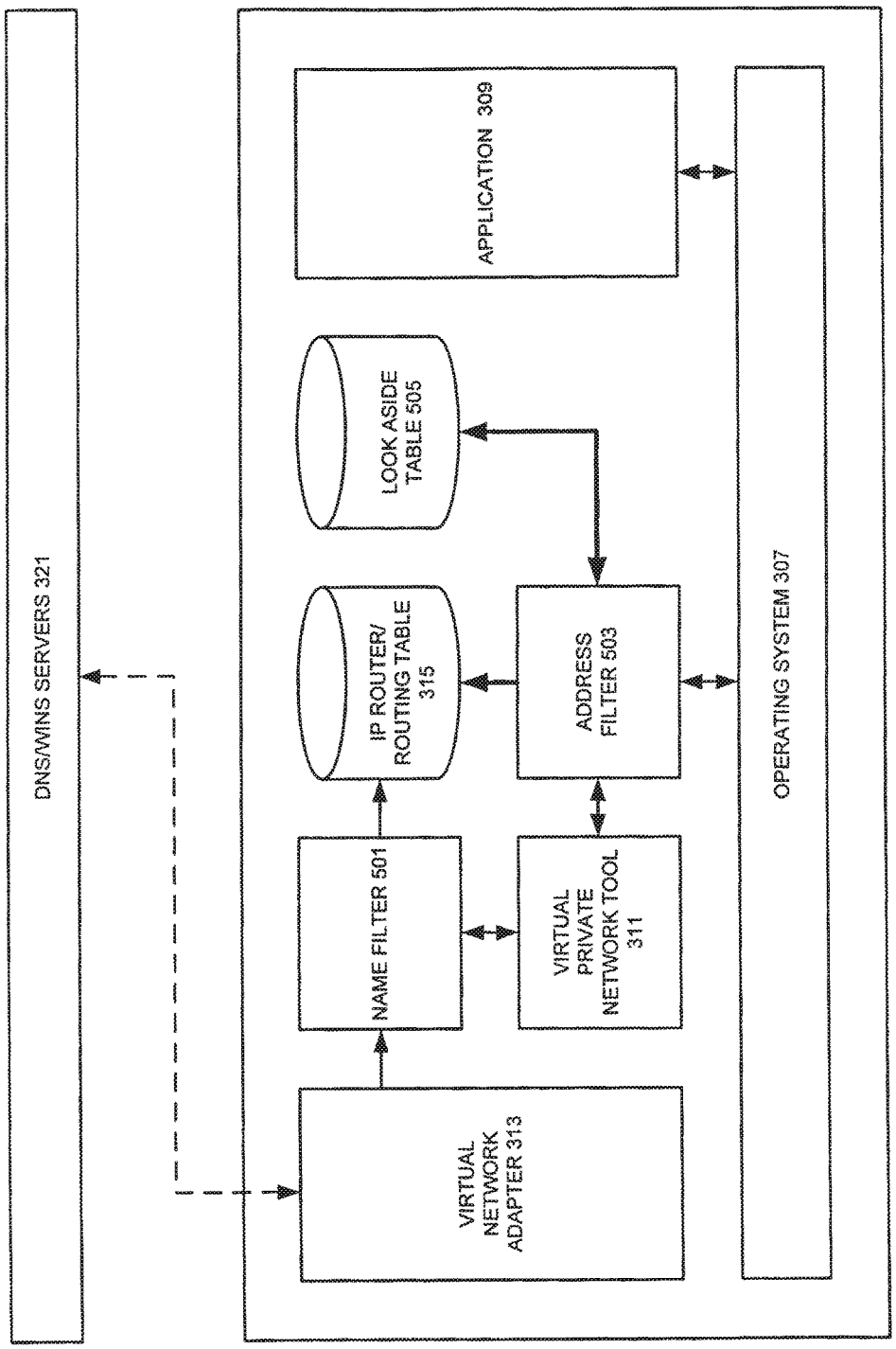
FIG. 5 illustrates the client computer shown in FIG. 3 in more detail.

FIG. 5 illustrates a more detailed example of a client computer 301 according to various examples of the invention. As seen in this figure, the client computer 301 includes a name filter 501, which can intercept data flowing from the virtual network adapter 313 to the IP router/routing table 315. The client computer 301 also includes an address filter 503 which maintains a look aside table 505. With some examples of the invention, the name filter 501, the address filter 503 or both may be implemented as part of the virtual private network tool 311. With alternate examples of the invention, however, the name filter 501, the address filter 503 or both may be implemented as a separate process from the virtual private network tool 311. The use of routing information when a resource 327 is referenced by its name will be discussed with reference to FIGS. 5 and 6, while the use of routing information when a resource 327 is referenced by its network address will be discussed with reference to FIGS. 5 and 7.

Figure 6:
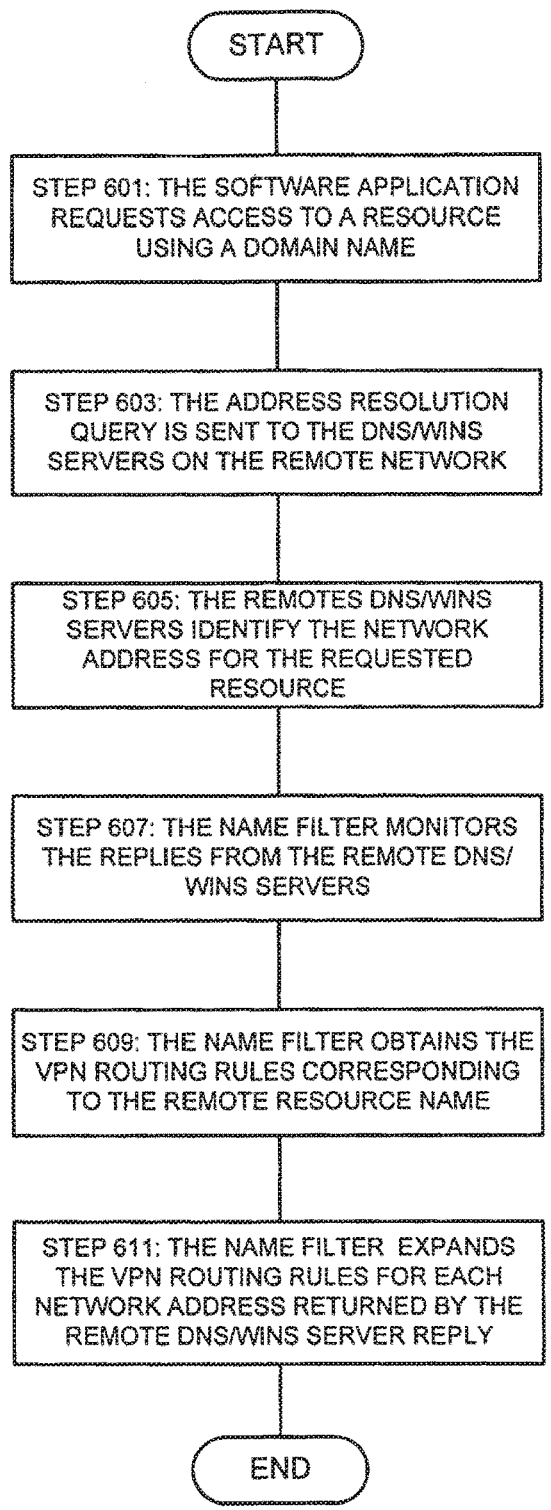
FIG. 6 illustrates a flowchart showing the use of routing information when a resource is referenced by its name.

Turning now to FIG. 6, in step 601, the software application 309 requests access to a resource using the name of the resource (e.g., its domain name). Based upon the routing information for the DNS/WINS servers 321 initially propagated to the IP router/routing table 315, the virtual network adapter 313 will transmit an address resolution query for the resource name to the DNS/WINS servers 321 in step 603. If the resource is a remote resource 327 and the DNS/WINS servers 321 can resolve the name in the query, the DNS/WINS servers 321 will return the network address corresponding to the resource 327 in step 605, which the virtual network adapter 313 then attempts to pass along to the IP router/routing table 315. In step 607, however, the name filter 501 will intercept and examine the contents of the reply. More particularly, the name filter 501 will examine the data packets for a DNS/WINS server reply returning through the virtual network adapter 313, and parse out the network addresses and domain name reference in the data packets.

In step 609, the name filter 501 searches the VPN routing rules to locate the routing information corresponding to the name of the requested resource 327. In step 611 the name filter 501 then expands the VPN routing rules maintained in the virtual private network tool 311 to include VPN routing rules specific to each network address returned by the DNS/WINS server reply. More particularly, if the VPN routing rules indicate that the client computer 301 can access the requested resource 327, then the name filter 501 will generate a corresponding VPN routing rule for each network address identified in the reply. If, however, the VPN routing rules indicate that the client computer 301 is not permitted to access the requested resource 327, then the name filter 501 will take no action. The name filter 501 then releases the reply returned by the DNS and WINS servers 321 to the application 309.

Figure 7:
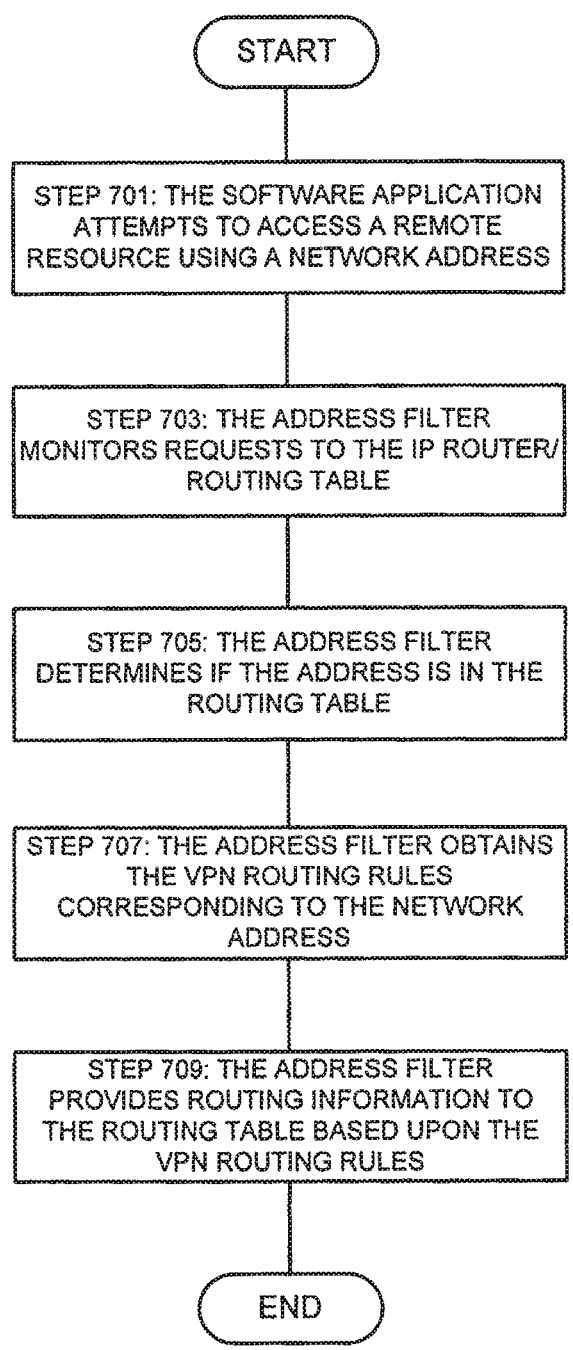
FIG. 7 illustrates a flowchart showing the use of routing information when a resource is referenced by its network address.

When the application 309 subsequently seeks to access a resource 327 using a network address (or, alternately, it initially attempts to directly access a resource 327 using a specific network address), it employs the process illustrated in FIG. 7. As seen in this figure, in step 701 the software application 309 attempts to access the requested resource 327 using a network address. This request for access, provided through the operating system 307, is intercepted by the address filter 503 in step 703. Next, in step 705, the address filter 503 determines if the VPN routing information for the requested resource 327 network address is already in the routing table 315. If the routing information is already in the routing table 315, then the address filter 503 simply releases the access request for action by the IP router/routing table 315. If, however, the routing information for the network address of the requested resource 327 is not in the routing table 315, then in step 707 the address filter 503 searches the VPN routing rules to locate the VPN routing rule or rules corresponding to the requested network address. By using the precedence rules discussed in detail above, the address filter 503 determines what routing information corresponding to the requested resource 327, if any, should be added to the IP router/routing table 315. In step 709 the name filter 501 then provides the appropriate routing information to the IP router/routing table 315.

More particularly, if the VPN routing rules indicate that the client computer 301 can access the resource 327 at the requested network address, then the address filter 503 will provide the routing information to the IP router/routing table 315. If, however, the VPN routing rules indicate that the client computer 301 is not permitted to access the resource 327 at the requested network address, then the address filter 503 will not provide the routing information to the IP router/routing table 315. The address filter 503 then releases the request to the IP router/routing table 315. If the corresponding routing information was added to the IP router/routing table 315 (or was already in the IP router/routing table 315), then the application 309 will be given access to the requested resource. If the corresponding routing information was not added to the IP router/routing table 315, then the IP router/routing table 315 will must use existing routing rules to access resource 327 via a physical adapter 229 as if it were an external computer 235.

It should be noted that the network address for the remote resource 327 may conflict with an existing network address in the IP router/routing table 315 (e.g., the network address for a local resource.) Typically, the architecture of the IP router/routing table 315 will include precedence rules for handling conflicts. For example, the IP router/routing table 315 will usually access the most specific address first. If this policy does not resolve the conflict, then the IP router/routing table 315 will follow priority metrics associated with the conflicting addresses. Because various embodiments of the invention only provide routing information for specific host addresses to the IP router/routing table 315, the routing information provided by the address filter 503 will take precedence over conflicting network addresses that are already in the IP router/routing table 315. Still further, with some implementations of the invention, the address filter 503 with additionally assign the highest priority metric for the routing information it provides to the IP router/routing table 315.

With some embodiments of the invention, the address filter 503 maintains a look aside table 505 as noted above. The look aside table 505 maintains a copy of the VPN routing information previously provided to the IP router/routing table 315. This allows the address filter 503 to determine if VPN routing information already has been provided to the IP router/routing table 315 without having to query the IP router/routing table 315. Still further, the look aside table 505 may include time information (e.g., a time stamp) associated with the use of each VPN routing information entry. Using this time information, the address filter 503 can periodically purge VPN routing information from the IP router/routing table 315 that has not been used within a preset amount of time.

It also should be noted that, in some situations, a remote resource 327 may initiate communications to the application 309. This type of communication, commonly known as back connect or peer to peer access, is used for, e.g., Voice over IP (VoIP) telephony applications. When this type of communication occurs, the remote resource 327 will send a data packet to the application 309 through the virtual network adapter 313 and the IP router/routing table 315. The address filter 503 then will intercept the data packet, and examine the source information contained in the data packet. If the source information includes a network address for a resource 327 that is not already in the IP router/routing table 315, then the address filter 503 with compare the source network address with the VPN routing rules to determine if the new network address should be added to the IP router/routing table 315 using the same process already described for when application 309 initiates access to resource 327 with a network address.

Thus, as described above, the IP router/routing table 315 receives any necessary VPN routing information on a "just-in-time" basis. Using this "just-in-time" approach allows a local resource and a remote resource 327 to share the same network address. A conflict between the local resource and a remote resource 327 only occurs when the application 309 specifically seeks to access the remote resource 327 using its network address.

Termination and Resumption of the Virtual Private Network

In some situations, the client computer 301 may terminate the virtual private network connection between the virtual private network tool 311 and the remote network 311. For example, the user may move from a wired connection with a LAN to a wireless connection with a different LAN. Alternately, the virtual private network connection may drop simply because of a temporary electrical connection failure.

When the virtual private network adapter 313 determines that it can no longer communicate with the remote network 303, it notifies the virtual private network tool 311 of the termination of the virtual private network connection. The virtual private network tool 311 will then attempts to resume the virtual private network session. When the virtual private network tool 311 reestablishes the virtual private network connection (or establishes a new virtual private network connection after an intentional termination of a previous virtual private network connection), it will again complete the authentication process with the authentication server 317. Once the authentication server 317 has established the identity of the client computer 301, then the virtual private network tool 311 can simply provide the existing state information for the virtual private network adapter 313 to the address assignment server 319 for renewal.

More particularly, the virtual private network tool 311 can provide the address assignment server 319 with the network information previously used to provision the virtual private network adapter 313. If the previous network information does not conflict with the critical network information for the new virtual private network connection (e.g., a new IP address for the physical network adapter), then the address assignment server 319 can authorize the virtual private network adapter 313 to continue to use that previous network information (and, with some implementations of the invention, previously assigned VPN routing rules). Thus, with some embodiments of the invention, the virtual private network tool 311 can easily and quickly resume a terminated virtual private network. Moreover, the resumption can be made without having to again obtain the related VPN routing rules.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while particular software services and processes have been described as performing various functions, it should be appreciated that the functionality of one or more of these services and processes may be combined into a single service or process, or divided among additional services and processes.

What is claimed is:

1. A method for securely accessing a remote resource on a remote network, the method comprising:
   receiving a communication from a server of the remote resource at a client device over a previously established virtual private network connection, the communication identifying network access information corresponding to the remote resource, wherein the network access information identifies at least one of a network address or a name associated with the remote resource;
   intercepting the communication at the client device;
   examining the network access information included in the communication from a remote resource server;
   comparing the network access information included in the communication received from the remote resource server with information stored in a routing table at the client device, the routing table including a set of initial routing rules for accessing a name server in the remote network, wherein the set is limited to one or more routing rules necessary for accessing the remote resource server;
   identifying that the network access information included in the communication is not currently included in the routing table;
   adding the network access information to the routing table at the client;
   requesting access to the remote resource by a client application stored in a memory of the client computing device using the name or the network address of the remote resource;
   transmitting to the name server an address resolution query for the name of the remote resource based on the one or more initial routing rules;
   intercepting a reply from the remote resource server intended for the client application, the reply including a network address corresponding to the name or the network address of the remote resource;
   obtaining from the memory a routing rule corresponding to the name of the requested resource;
   identifying that the client computing device is permitted to access the requested resource based on the routing rule;
   generating a routing rule for the network address identified in the reply;
   providing to the client application the routing rule for the network address generated from the intercepted reply; and
   opening by the client application a secure connection with the remote network based on the generated routing rule.

2. The method of claim 1, wherein a virtual private network tool residing at the client device collects information identifying an internet protocol address for one or more network adapters at the client device.

3. The method of claim 2, wherein the virtual private network tool also collects information regarding a subnet for the one or more network adapters at the client device.

4. The method of claim 1, wherein the remote resource server is at least one of is at least one of a Domain Name Server or a Windows Internet Naming Service server.

5. The method of claim 1, wherein the network access information is collected by querying an application program interface (API) at the client device.

6. The method of claim 1, wherein a virtual address is assigned by the remote resource server that the client device may use when accessing the remote resource.

7. The method of claim 6, wherein the assigned virtual address does not conflict with network addresses local to the client device.

8. A non-transitory computer-readable storage medium having embodied thereon a program executable by a processor for implementing a method for securely accessing a remote resource on a remote network, the method comprising:
   receiving a communication from a server of the remote resource at a client device over a previously established virtual private network connection, the communication identifying network access information corresponding to the remote resource, wherein the network access information identifies at least one of a network address or a name associated with the remote resource;
   intercepting the communication at the client device;
   examining the network access information included in the communication from a remote resource server;
   comparing the network access information included in the communication received from the remote resource server with information stored in a routing table at the client device, the routing table including a set of initial routing rules for accessing a name server in the network, wherein the set is limited to one or more routing rules necessary for accessing the remote resource server;
   identifying that the network access information included in the communication is not currently included in the routing table;
   adding the network access information to the routing table at the client;
   requesting access to the remote resource by a client application stored in a memory of the client computing device using the name or the network address of the remote resource;
   transmitting to the name server an address resolution query for the name of the remote resource based on the one or more initial routing rules;
   intercepting a reply from the remote resource server intended for the client application, the reply including a network address corresponding to the name or the network address of the remote resource;
   obtaining from the memory a routing rule corresponding to the name of the requested resource;

identifying that the client computing device is permitted to access the requested resource based on the routing rule;

generating a routing rule for the network address identified in the reply;

providing to the client application the routing rule for the network address generated from the intercepted reply; and opening by the client application a secure connection with the remote network based on the generated routing rule.

9. The non-transitory computer-readable storage medium of claim 8, wherein a virtual private network tool residing at the client device collects information identifying an internet protocol address for one or more network adapters at the client device.

10. The non-transitory computer-readable storage medium of claim 9, wherein the virtual private network tool also collects information regarding a subnet for the one or more network adapters at the client device.

11. The non-transitory computer-readable storage medium of claim 8, wherein the remote resource server is at least one of is at least one of a Domain Name Server or a Windows Internet Naming Service server.

12. The non-transitory computer-readable storage medium of claim 8, wherein the network access information is collected by querying an application program interface (API) at the client device.

13. The non-transitory computer-readable storage medium of claim 8, wherein a virtual address is assigned by the remote resource server that the client device may use when accessing the remote resource.

14. The non-transitory computer-readable storage medium of claim 13, wherein the assigned virtual address does not conflict with network addresses local to the client device.

15. An apparatus for securely accessing a remote resource on a remote network, the apparatus comprising:

a network interface that receives communication from a server of the remote resource at a client device over a previously established virtual private network connection, the communication identifying network access information corresponding to the remote resource, wherein the network access information identifies at least one of a network address or a name associated with the remote resource;

a memory; and a processor, wherein the processor executing instructions out of the memory:

intercepts the communication;

examines the network access information included in the communication from a remote resource server;

compares the network access information included in the communication received from the remote resource server with information stored in a routing table stored in the memory, the routing table including a set of initial routing rules for accessing a name server in the network, wherein the set is limited to one or more routing rules necessary for accessing the remote resource server;

identifies that the network access information included in the communication is not currently included in the routing table;

adds the network access information to the routing table at the client, wherein:

access to the remote resource is requested by a client application using the name or the network address of the remote resource, and the network interface transmits to the name server an address resolution query for the name of the remote resource based on the one or more initial routing rules;

intercepts a reply from the remote resource server intended for the client application, the reply including a network address corresponding to the name or the network address of the remote resource, obtains from the memory a routing rule corresponding to the name of the requested resource, identifies that the client computing device is permitted to access the requested resource based on the routing rule, and generates a routing rule for the network address identified in the reply, and provides to the client application the routing rule for the network address generated from the intercepted reply; wherein the client application opens a secure connection with the remote network based on the generated routing rule.

16. The apparatus of claim 15, wherein a virtual private network tool residing at the client device collects information identifying an internet protocol address for one or more network.

17. The apparatus of claim 16, wherein the virtual private network tool also collects information regarding a subnet for the one or more network adapters.

18. The apparatus of claim 16, wherein the remote resource server is at least one of is at least one of a Domain Name Server or a Windows Internet Naming Service server.

* * * * *